United States Patent [19]
Bril

[11] Patent Number: 5,990,969
[45] Date of Patent: Nov. 23, 1999

[54] METHOD AND APPARATUS FOR REFRESHING A DISPLAY SCREEN OF A TELEVISION SYSTEM WITH IMAGES REPRESENTING NETWORK APPLICATION DATA

[75] Inventor: Vlad Bril, Campbell, Calif.

[73] Assignee: TeleCruz Technology, Inc., San Jose, Calif.

[21] Appl. No.: 09/001,303

[22] Filed: Dec. 31, 1997

[51] Int. Cl.⁶ .................................................. H04N 5/445
[52] U.S. Cl. ...................... 348/553; 348/563; 348/564; 348/569; 348/718
[58] Field of Search ...................... 348/553, 563, 348/564, 569, 589, 600, 714, 718, 719; H04N 5/445, 9/64

[56] References Cited

U.S. PATENT DOCUMENTS 4,768,083  8/1988  Romesburg .
5,539,428  7/1996  Bril et al. ................................. 345/143
5,611,041  3/1997  Bril et al. ................................. 395/507

*Primary Examiner*—Sherrie Hsia
*Attorney, Agent, or Firm*—Law Firm of Naren Thappeta

[57] ABSTRACT

A memory controller for controlling accesses to a memory storing display entities including network application data displayed on a display screen of a television system. For performing a display screen refresh operation, the network application data is retrieved with a predetermined period. Accordingly, the memory controller determines an expected time for receiving the next request for retrieving the network application data for screen refresh. The memory controller bolcks any lower priority memory access requests from a few clock cycles prior to the determined expected time. As a result, the requests for retrieving network application data can be serviced in an acceptable time.

9 Claims, 8 Drawing Sheets

METHOD AND APPARATUS FOR REFRESHING A DISPLAY SCREEN OF A TELEVISION SYSTEM WITH IMAGES REPRESENTING NETWORK APPLICATION DATA

RELATED APPLICATIONS

The present application is related to the following co-pending U.S. Patent Applications, which are incorporated by reference in their entirety herewith:
1. Patent application entitled, "A Method and Apparatus for Enabling a User to Access Data Network Applications from a Television System", Filed Jun. 2, 1997, Ser. No. 08/867,203, Attorney Docket Number: TCRZ-0001 (hereafter "RELATED APPLICATION 1");
2. Patent Application Entitled, "A Circuit and Method for Generating a Clock Signal Synchronized with Time Reference Signals Associated with Television Signals", Filed even date herewith, Ser. No. 09/001,413, and Attorney Docket Number: TCRZ-0010 (hereafter "RELATED APPLICATION 2");
3. Patent Application Entitled, "Flicker Filter and Interlacer Implemented in a Television System Displaying Network Application Data Represented in a Non-Interlaced Format", Filed on even date herewith, Ser. No. 09/001,304, and Attorney Docket Number: TCRZ-0009 ("RELATED APPLICATION 3"); and
4. Patent Application Entitled, "A Method and Apparatus for Reducing Flicker in the Television Display of Network Application Data", Filed on even date herewith, Ser. No. 09/001,410, and Attorney Docket Number: TCRZ-0002 ("RELATED APPLICATION 4").

BACKGROUND OF THE INVENTION

1. Field of the Invention

The present invention relates to television systems, and more specifically to a method and apparatus for accessing data representing various display entities stored in a memory unit of a television system.

2. Related Art

Since the 1940s, television systems have been increasingly embraced by many households, particularly in the industrial countries. Television systems have generally been used to view broadcasts made in distant parts of the world or to view a pre-recorded program from a video cassette player (VCP). A significant proportion of the households presently have at least one television set in their homes. Television displays are presently available or anticipated to be widely available in analog (e.g., NTSC analog signal displayed on a CRT based display screen) as well as digital technologies (e.g., HDTV).

In parallel, data network applications (hereafter "network applications") have experienced a phenomenal growth since the mid—1980s. Network applications such as web-browsing and electronic mail have had a fundamental impact on the manner in which information is exchanged and disseminated. These network applications have particularly been implemented for and used along with computer systems such as personal computer systems, work-stations, and the like.

At least in view of the considerable presence of the television systems in the households, it may be desirable to provide the capability to access network applications on television systems. To provide access to the network applications (or services), images representing network application data may be displayed on a display unit of a television system. Display of network application data is typically achieved by refreshing a display screen with image of the network application data several times in a second.

The data representing network applications (network application data) or pixel data elements representing network application data may be stored in a memory of a television system to facilitate such refresh operations. For each refresh operation, the memory is accessed several times, with data corresponding to a portion of the image being retrieved each time. Accordingly, it may be appreciated that the memory is accessed several times for a typical screen refresh operation.

The memory may be accessed for several other purposes as well. For example, the memory may be accessed to modify the network application data as new data arrives. The memory may be used to store other data as well, requiring even more accesses to the memory. As the number of accesses to the memory at any given time can only be limited (e.g., one for a single ported memory), some memory access requests may be blocked while others are being processed.

Such blocking may be undesirable when network application data (or pixel data elements thereof) are being retrieved, for example, when the network application data is sought to be retrieved for refreshing a display screen of a television system. If the requests to retrieve network application data from the memory are not serviced (processed) in a timely fashion, network application data may not be available when required for generating display signals. As a result, display artifacts may result in the display on the displays screen. Such display artifacts may be undesirable.

Therefore, what is needed is a method and apparatus which enable the network application data to be retrieved from a memory in a timely fashion in the face of other types of accesses to the memory.

SUMMARY OF THE INVENTION

The present invention is directed to a method and apparatus for accessing the display entities stored in a memory of a television system. The display entities include network application data, the display of which enables a user to access various services and data on an external network. A memory controller controls accesses to the memory and ensures that the requests for retrieving the network application data for refresh operation are serviced in a timely manner to avold any display artifacts which may result otherwise.

Specifically, a data path is provided to access portions of the network application data (preferably stored as a bit map) and process the retrieved data prior to the generation of display signals. The data path sends requests for retrieving the network application data. The expected time of arrival of these retrieval requests can be determined. In one embodiment, the requests for retrieving the network application data are received with a predetermined period. That is, successive requests are received with an interval equal to the predetermined period. Accordingly, the memory controller can determine an expected time for receiving the next request for retrieving the network application data in this embodiment.

The memory controller provides a higher priority to access the network application data, and blocks any new lower priority memory access requests to the memory starting from a few clock cycles prior to the determined expected time. If any lower priority memory access requests which can access the memory for a long time are in progress, the memory controller starts suspending such lower priority accesses a few clock cycles prior to the expected arrival time. These few clock cycles enable the suspension operation to be complete at least within an acceptable number of clock cycles after receiving the request for retrieving the network application data.

As new lower prior requests are blocked and the in-progress lower priority requests are suspended ahead of the expected arrival time, the request to access the network application data can be served within an acceptable number of clock cycles upon arrival. Accordingly, display artifacts may be avoided.

According to another aspect of the present invention, data paths processing other display entities stored in the memory are designed such that the requests for retrieving the corresponding display entity are generated with a same period as that of the requests for retrieving network application data for refresh operation. The memory controller is designed to serve the requests for display entities before any lower priority requests. By ensuring that the data paths generate retrieval requests around the time the request for retrieving the network application data is generated and by providing access first to these retrieval requests among all the pending requests, the memory controller of the present invention ensures that the data corresponding to all display entities are available for a screen refresh in a timely manner.

In an alternative embodiment, data paths processing other display entities may not have an equal period for generating the requests for retrieving the corresponding data stored in the memory. Accordingly, a block request is generated independently for each display entity. Each block request causes the lower priority requests to be blocked or suspended to ensure that the corresponding display entity is available for display in a timely manner. Instead of having a separate block signal line for each display entity, a single signal line can be asserted to ensure the required blocking (or suspension).

Thus, the present invention ensures that the network application data is available in a timely manner for refresh operations. This is accomplished by determining an expected time for receiving the next request for retrieving network application data (for refresh) and blocking any new lower priority access requests from a few clock cycles prior to the determined expected time. In addition, the memory controller begins suspending any low priority requests being serviced (i.e., provided access to the memory) at a few clock cycles before the determined expected period.

The present invention ensures the availability of other display entities also in a timely manner for refresh operations by ensuring that the requests for retrieving these display entities are also received around the same time as when the requests for retrieving the network application data are received, and servicing all the retrieval requests for refresh purpose with a higher priority.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein:

FIG. 9A is a timing diagram illustrating the manner in which the requests for retrieving display entities can be serviced without undue delays in an embodiment of the present invention.

DETAILED DESCRIPTION OF THE PREFERRED EMBODIMENTS

1. Overview and Discussion of the Invention

The present invention is described in the context of a television system, which displays images representing network application data along with images encoded in a television signal. Network application data generally corresponds to the data received from a network while accessing various services on the network. The television system stores the network application data in a memory.

The images representing the network application data are displayed on a television display screen along with the images encoded in a television system. Display of images is generally achieved by refreshing the display screen several times in quick succession. Accordingly, the network application data may be retrieved from the memory for each refresh cycle.

A memory controller is used to control accesses (storing and retrieval) to the memory. The memory controller provides higher priority for requests directed to retrieving the network application data for display (or refresh) purpose. The memory controller ensures that lower priority memory access requests do not delay the higher priority network application data access requests by determining whether a request for retrieval of the network application data may be received in the near future (measured, for example, by a number of memory clock cycles), and blocking (or suspending) the low priority requests to ensure that the request to retrieve network application data is served in a timely fashion. The present invention will be described in further detail below with reference to several examples.

2. Method of the Present Invention

Figure 2:
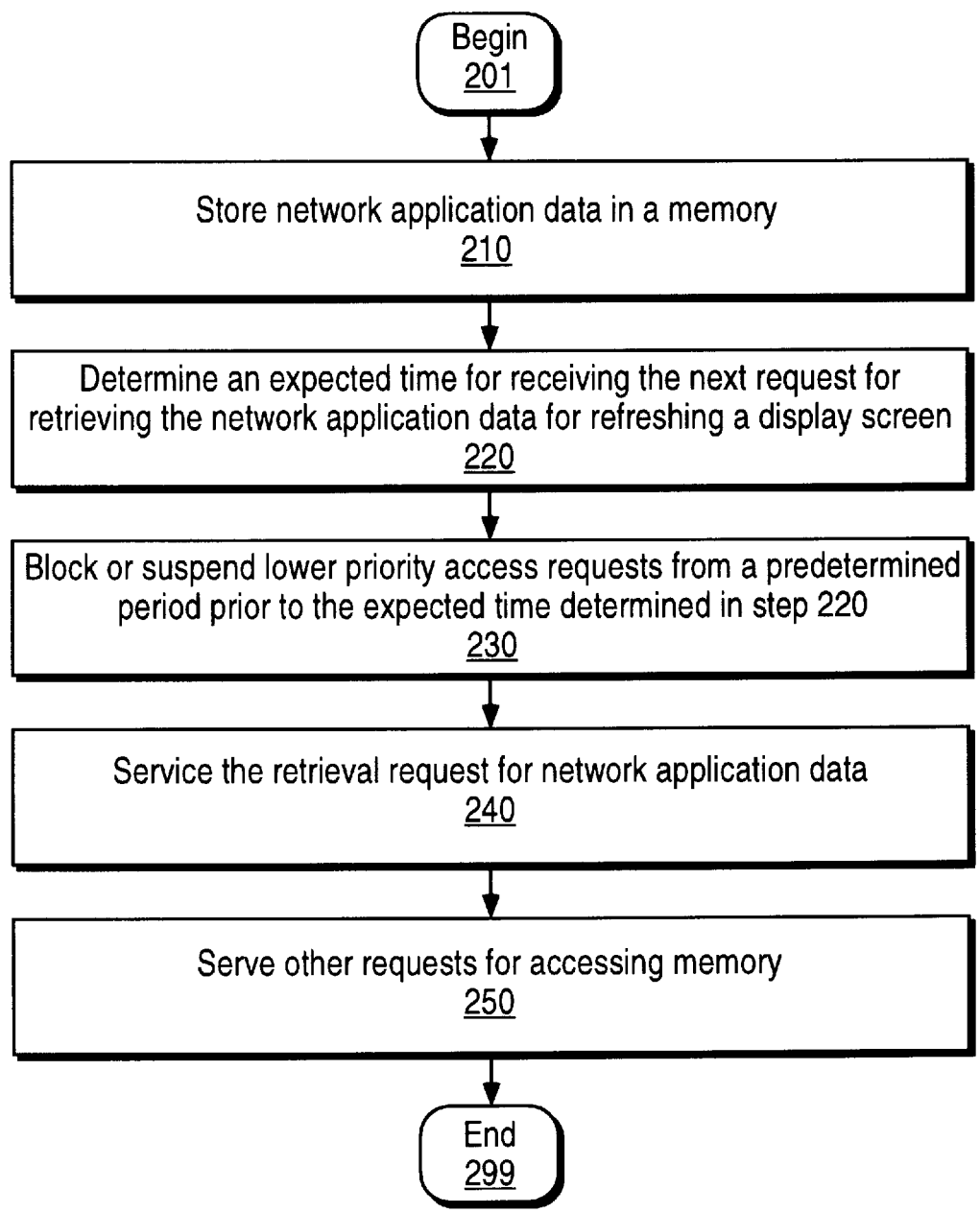
FIG. 2 is a flow chart illustrating a method in accordance with the present invention.

The present invention is described further with reference to the flow-chart of FIG. 2. In step 210, a television system stores the network application data in a memory, preferably in the form of pixel data elements. The pixel data elements together represent an image corresponding to the network application data. Accordingly, the present invention will be described substantially with reference to the retrieval of pixel data elements. However, it should be understood that the network application data can be stored in other forms and processed in accordance with the present invention, as will be apparent to one skilled in the relevant arts by reading the description herein.

In step 220, the television system determines an expected time for receiving the next request for retrieving the network application data. In an embodiment described below, the requests for retrieving the network application data are received cyclically with a period which can be determined ahead. Accordingly, the predetermined amount of time is set equal to the period with which such requests are generated. However, it should be understood that the present invention may be implemented in other environments which allow a determination of the expected time of arrival of the next retrieval request.

The television system may be designed to include other display entities (described below) also, and these display entities are also processed and displayed such that the requests for retrieving these display entities are also received with the same period. Therefore, all the requests for retrieving display entities may be received around the same time in this embodiment. All such requests may be given higher priority compared to other types of requests to ensure that the data corresponding to the display entities is available in a timely manner for generating display signals. Therefore, it should be understood that the present invention can be implemented with any display entities, which will be retrieved in a cyclical manner with a period that can be determined beforehand.

In step 230, any newly arriving other types of requests (which may not be required for refreshing a display screen) are blocked from a predetermined period prior to the expected time determined in step 230. Any presently serviced other type of requests can be suspended if the nature of the request allows resumption at a later convenient time. The blocking (and suspension) can continue until the next request to retrieve network application data (and possibly any other display entities) is received.

In step 240, the next request for retrieval of network application data is received in due course. The request may be received around the time determined in accordance with step 220. Once this request for retrieval is received, the requested network application data is retrieved from the memory, and provided for display on a display unit. In step 250, other memory access requests including any blocked or suspended requests are served.

Thus, by blocking the other memory requests in anticipation of receiving the request for retrieval of network application data, a method in accordance with the flow-chart of FIG. 2 can ensure that the network application data (and any other display entities) is provided for display in a timely manner. Accordingly, display artifacts can be avoided. The present invention is described below in further detail with reference to one or more example embodiments. The method described in flow-chart of FIG. 2 can be implemented in such example embodiments, among others.

3. Example Embodiment for Implementing the Present Invention

In a broad sense, the present invention can be implemented in any television system. For purposes of illustration, the invention will be explained in the context of a television system implemented using analog (e.g., using CRTs) technology. However, it will be apparent to one skilled in the art how to implement the present invention with digital technologies (e.g., HDTV supporting interlaced format) without departing from the scope and spirit of the present invention by reading the description herein.

Figure 1:
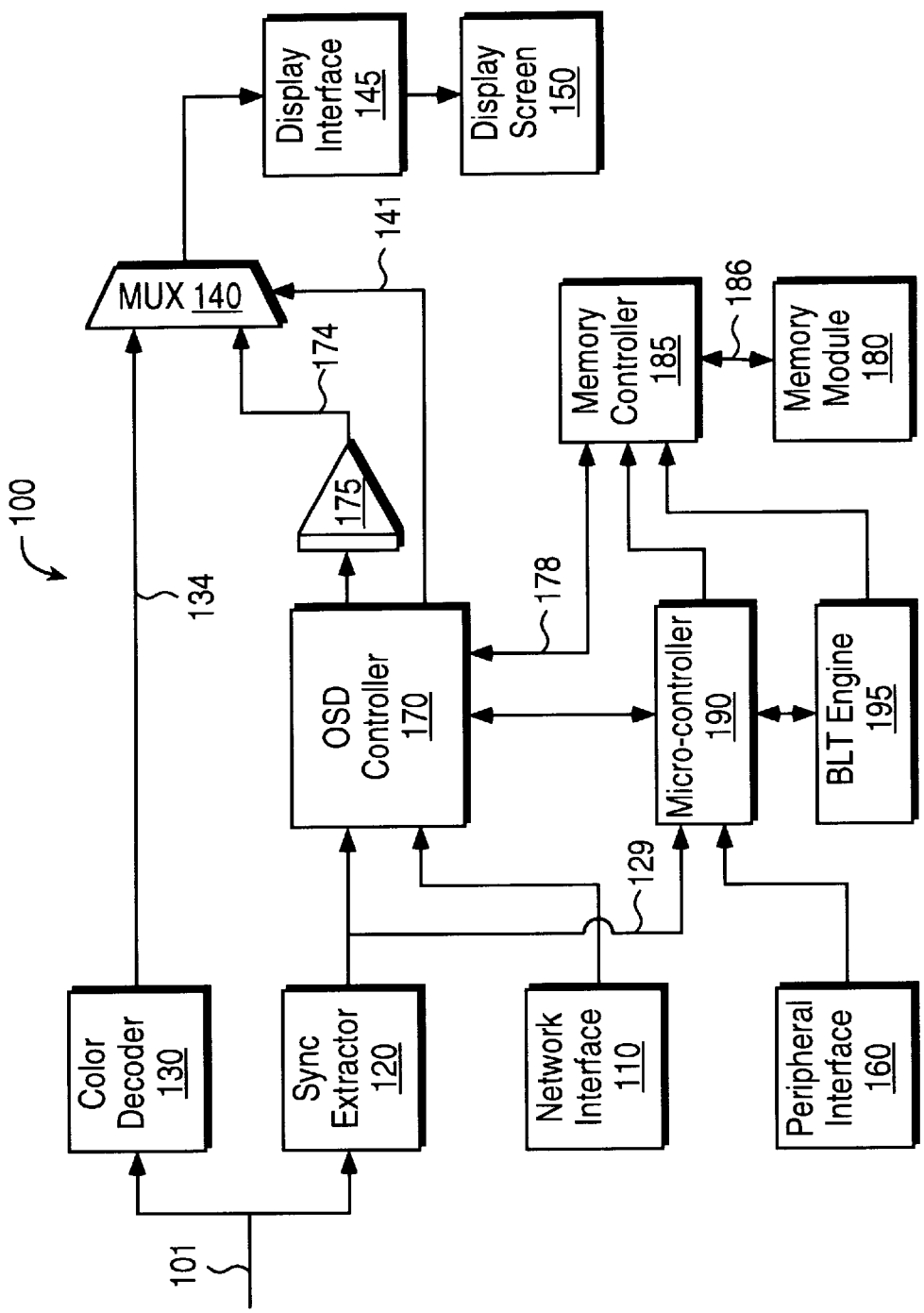
FIG. 1 is a block diagram of a television system illustrating an environment in which the present invention can be implemented.

FIG. 1 is a block diagram of an example television system (TV) 100 in which the present invention can be implemented. The operation, structure and use of television system 100 as relevant to the present invention is described here. However, one or more embodiments of television system 100 are explained in further detail in RELATED APPLICATION 1. Television system 100 comprises sync extractor 120, color decoder 130, multiplexor 140, display interface 145, display screen 150, peripheral interface 160, on-screen-display (OSD) controller 170, digital-to-analog converter (DAC) 175, memory controller 185, memory module 180, micro-controller 190 and bit block transfer (BLT) engine 195. Each of the components of TV 100 are explained in further detail below.

Sync extractor 120 and color decoder 130 receive a television signal from sources such as cable service providers, television (relay) stations, digital video disk players etc. The TV signal is generally received in a known format, for example, in NTSC composite video format. However, television signal can be any other signal including an interlaced display signal and corresponding synchronization signals. Decoder 130 extracts the interlaced display signal which is encoded in the television signal and provides the display signal to multiplexer 140 on display signal line 134.

Sync extractor 120 extracts (or generates) synchronization signals present in the television signal in a known way. The synchronization signals are provided to micro-controller 190 and OSD controller 170 to coordinate the network application data flow consistent with the reception of the television signal. In one embodiment (described in RELATED APPLICATION 2), the clock signals driving the OSD controller 170 are genlocked to the synchronization signals.

Network interface 110 receives network application data from an external source. The display of network application data enables a user to access various services on an external network using TV 100. Network interface 110 can be a telephone modem, cable modem or any other interface which is designed to operate with the external source. The external source can be, for example, a dial-up connection (point-to-point) or a network connection implemented using a communication protocol. Even though network interface 110 is shown as a single block, it should be understood that it may contain more than one unit depending on the specific requirements of the individual television system.

Network interface 110 receives data corresponding to a network application such as web-browsing, electronic mail in a known way. The data may be received in one of known formats such as ASCII, HTML, VRML etc., which are encoded as electrical signals. Network interface 110 sends signals representative of the network application data to OSD Controller 170.

OSD Controller 170 receives network application data from network interface 110, and stores the received data in memory module 180 by interfacing with memory controller 185. In one embodiment, OSD controller 170 converts the network application data to pixel data elements, with the pixel data elements together representing an image (network application data image) of the network application data.

OSD Controller 180 transforms the network application data as is suitable for storage and retrieval from memory module 180. The storage scheme may include conventions to represent the area on which network application data is to be displayed. In one example embodiment, OSD controller 180 stores the network application data as a "bit map" encoded in RGB format in memory module 180. Each element of such bit map may be termed as a pixel data element.

OSD controller 180 generates requests to retrieve pixel data elements of network application data. The pixel data elements, received in response, may correspond to network application data image in a non-interlaced format. OSD controller 180 can provide pixel data elements corresponding to an image of an interlaced format. This conversion simplifies the overlay process between the television signal display and network application data display. In addition, OSD controller 180 filters the pixel data elements received to smooth out the network application data image. The pixel data elements representing the smoothened image (i.e., without sharp transitions) is provided in the interlaced format. The manner in which filtering and interlacing is performed in an embodiment is described in RELATED APPLICATION 3.

OSD controller 170 may be designed to store in memory module 180 other display entities such as those described in below and in RELATED APPLICATION 1. These display entities may provide additional capabilities or enhance the ease of use of television system 100. OSD controller 170 generates additional requests to retrieve data corresponding to these display entities. OSD controller 170 retrieves data corresponding to all the display entities store in memory module 180 by interfacing with memory controller 185 and generates a combined display by selecting one of the display entities on a point-by-point basis. As described below, memory controller 185 provides higher priority to the requests for retrieving the display entities stored in memory module 180 to prevent possible display artifacts which may otherwise result.

Micro-controller 190 receives synchronization signals from sync extractor 120 on line 129 and configures the remaining components based on the synchronization signals. For example, micro-controller 190 causes the creation of bit-maps corresponding to the received network application data. For efficient transfer (storage or retrieval) of large chunks of data from or to memory module 180, micro-controller 190 uses BLT engine 195 as described below. Large chunks of data are typically transferred to change the image of the display entities stored in memory module 180. In addition, micro-controller 190 can access memory locations in memory module 180 directly. Such direct accesses may be performied, for example, to receive program instructions for the operation of micro-controller 190.

Micro-controller 190 ensures that the pixel data elements received on lines 134 (for television signal) and 178 (the overlaid image of display entities stored in memory module 180) correspond to the same point/pixel on display screen 150. Micro-controller 190 generates control and clocking signals to coordinate and control the operation of the remaining components of television system 100. For purpose of clarity, only some of the connections from micro-controller 190 are shown in FIG. 1.

Bit BLT (block transfer) engine 190 operates under the control of micro-controller 190. BLT engine 190 is typically used to move a block of data representing a rectangle from one area of the memory to another area. The move generally represents the movement of an image block from one area of display screen 150 to another area. Accordingly, BLT engine 190 receives information identifying the source rectangle and a destination rectangle. BLT engine 190 performs the required retrieve and store operations corresponding to the received move commands and sends a completion signal to micro-controller 190. The store and retrieve operations may be performed in a burst for efficiency and may accordingly consume several memory cycles. During such a burst transfer, BLT engine 190 has exclusive access to memory module 180.

As described below, BLT transfer requests are serviced with a lower priority compared to the requests to retrieve the display entities stored in memory module 180. Lower priority processing can include either blocking new BLT requests or suspending presently serviced requests to enable the requests to retrieve display entities to be serviced in a timely manner.

Memory controller 185 controls access to memory module 180 in accordance with the present invention. In one embodiment, memory controller 185 receives access requests from OSD controller 170, micro-controller 190, and BL engine 195. In response, memory controller 185 generates a grant signal indicating which of the access request has been granted. The grant signal can be deasserted during an access operation, which causes the access operation to be suspended. During such periods of suspension, the access request signal may be continued to be asserted until the memory access is granted and the access is completed.

As noted above, memory module 180 may be accessed by BLT engine 195, micro-controller 190 and OSD controller 170, with BLT accesses potentially having exclusive access for a long duration. To ensure that network application data is available for display in a timely manner, memory controller 185 provides higher priority to request for retrieving the display entities (or pixel data elements representing the display entities).

In one embodiment described below, the arrival time of the next retrieval request for network application data is determined, and memory access requests from BLT engine 195 are blocked from a predetermined amount of time prior to the determined arrival time. Accordingly, memory controller 185 ensures that the requests for retrieval of pixel data elements representing display entitles are served in a timely fashion.

Thus, memory controller 185 interfaces with OSD controller 170, micro-controller 190 and BLT engine 195 to store and retrieve data from memory module 180. The implementation of memory controller 185 depends also on the specific technology chosen for memory module 180, and can be provided integral to a memory storage unit. Memory module 180 may include one or more physical memory units as suitable for the specific requirements for which TV 100 is designed for.

Digital-to-analog converter (DAC) 175 receives the pixel data elements representing the smoothened image from OSD controller 170 and generates analog display signals on line 174 from the pixel data elements. Each pixel data element typically represents the color of a point on display screen 150 when line 141 indicates that network application data is to be displayed.

Multiplexor 140 receives the interlaced television signal and the analog display signals as inputs on lines 134 and 174 respectively, and selectively forwards one of the two inputs to display panel interface 145 under the control of select line 141. The select line is controlled by OSD controller 170 in one embodiment. As the two signals received on lines 134 and 174 correspond to the same point on display screen, the selection is performned on a point-by-point basis. The selection results in an overlay.

Thus, the television signal display and network application data display are overlaid before a unified display is provided on display screen 150. From the description herein, it will be apparent that multiplexor 140 along with OSD controller 170 form a selection circuit to overlay the display entities displayed by television 100. In one embodiment, select line 141 is controlled by OSD Controller 170 and each multiplexor input corresponds to a single pixel on display screen 150.

Multiplexor 140 along with select line 141 operates to select between the television signal and the pixel data received on line 174. Even though the processing of television signal and network application data is explained with reference to RGB data, it should be understood that the present invention can be implemented using other data formats also without departing from the scope and spirit of the present invention.

In the description above, multiplexor 140 and DAC 175 operate as a selection circuit. The selection circuit operates in an analog domain in the sense that the inputs to multiplexor 140 are in the form of analog signals. However, it should be understood that the selection can be performed in a digital domain as well without departing from the scope and spirit from the present invention. Such a digital operation is described in RELATED APPLICATION 1.

Display interface 145 receives display signals from multiplexor 140, and provides any signaling interface required for display on display screen 150. If display screen 150 is implemented as a CRT screen, display interface 145 generates electrical signals to control the scan circuitry usually associated with CRT screens. The design and implementation of display interface 145 depends on the specific technology chosen for display screen 150. The implementation of display interface 145 will be apparent to one skilled in the art. It is contemplated that the present invention can be implemented with technologies such as digital television systems (e.g., HDTV) and that-panel based TVs, projection TVs based on DMD (digital mirror display) and the like.

Peripheral interface 160 can include an interface for one or more peripherals. In one embodiment, interfaces are provided for push-buttons and infra-red remote. Push-buttons can be found on conventional television sets, and are generally used for functions such turning the television set ON/OFF, volume control etc. Infra-red remote interface operates in conjunction with remote control devices, which may be used for several functions such as television control (tuning, voice control, remote control etc.), enabling network applications etc. Devices such as key-boards which facilitate easy entry of ASCII data can be interfaced using infra-red interfaces. The implementation of these interfaces will be apparent to one skilled in the relevant arts.

Thus, memory controller 185 ensures that the network application data is available for display in a timely manner to avoid any display artifacts which may otherwise result in the display on display screen 150. The request for network application data arc generally received from OSD controller 170. OSD controller 170 can request access to other types of data stored in memory module 180. These other types of data are explained below with reference to display entitles and an example implementation of memory module 180.

4. Display Entities

As briefly noted above, different display entities are overlaid to provide one unified display on display screen 150. In one embodiment, the display entities include network application data (representative of external data applications a user may wish to use), television signal, pointer, and low resolution data (e.g., to display status messages on TV 100). Web browsing application is an example of a network application. However, the word network application as used here can include other applications accessed by point-to-point communication path also.

Each of the display entities is modeled as a surface that is mapped to a single coordinate system. Such a single coordinate system enables the present invention to correlate each point on the surfaces of display entities to a point/pixel on display screen 150. As a result, OSD controller 170 can determine which display entity to display on display screen 150 on a point by point basis.

In the description here, each surface and the overall final display will be explained as having the same dimension as display screen 150. However, it should be understood that the surfaces may have larger dimensions, and only portions of such larger dimensions may be mapped to display screen 150. The portions displayed on display screen may be controlled by graphics interfaces such as scroll-bars. Such extensions will be apparent to one skilled in the relevant arts based on the description provided herein.

To overlay these display entities, OSD controller 170 generates requests to retrieve data representing all the display entities. The retrieved data is used to overlay the surfaces as described in RELATED APPLICATION 1. The image resulting from the overlay is displayed on display screen 150. The manner in which the surfaces (or display entities) are overlaid and displayed in one embodiment is described in detail below.

5. Example Implementation of Memory Module

Figure 5B:
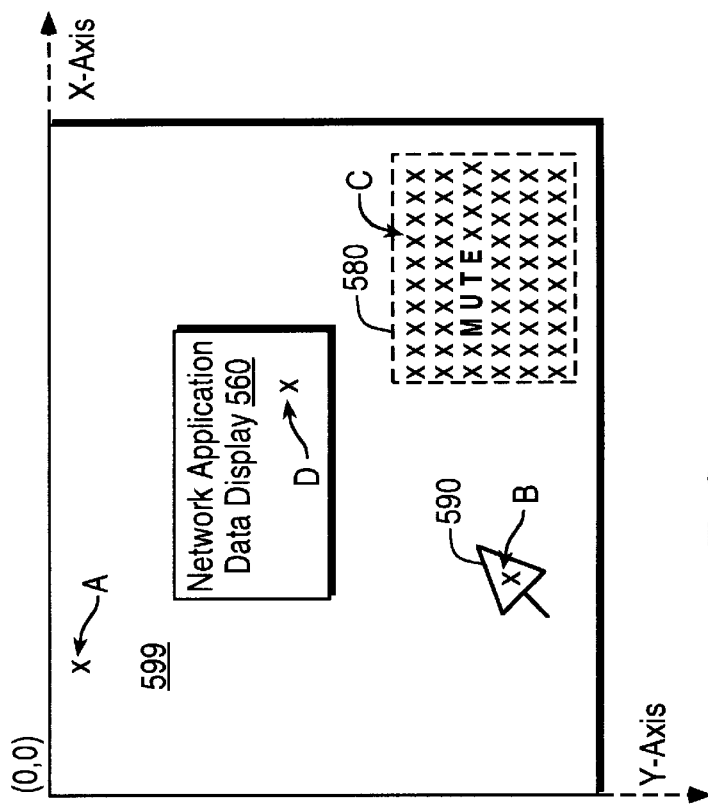
FIG. 5B is a diagram of an image on a display screen illustrating the relationship between the desired image and the manner in which display entities are stored in a memory module.
Figure 5A:
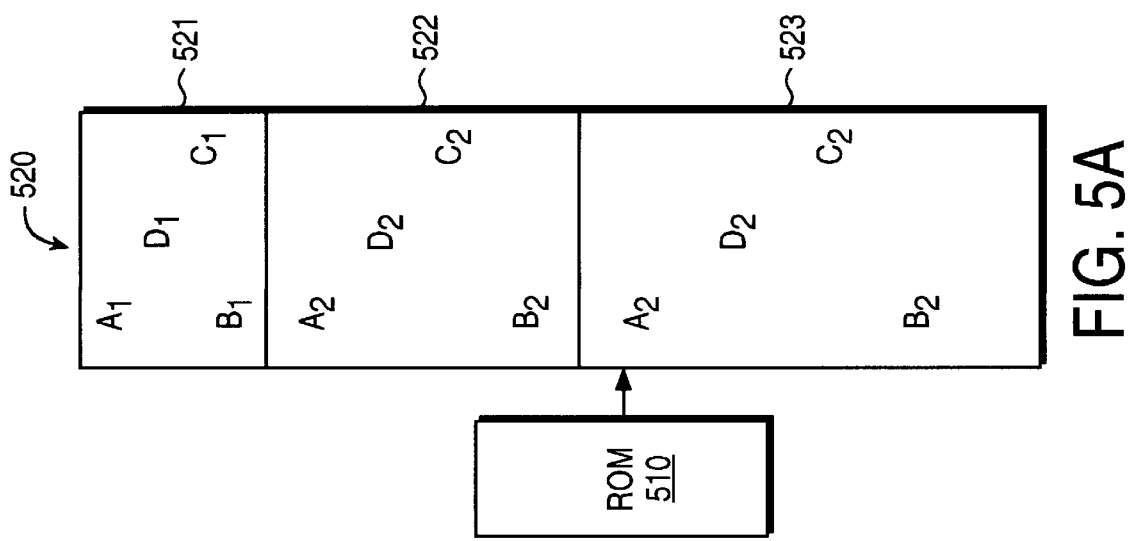
FIG. 5A is a block diagram of a memory unit illustrating an example method of storing the display entities.

An example implementation of memory module 180 and the data storage convention is explained with reference to FIGS. 5A and 5B. FIG. 5A is a block diagram illustrating memory module 180 in one embodiment. FIG. 5B represents display 599 on a television display screen 150 when data in RAM 520 is processed according to an embodiment of the present invention. As will be clear from the description below, FIG. 5A in conjunction with FIG. 5B illustrate a convention according to different display entities can be combined.

With reference to FIG. 5A, memory module 180 can include ROM 510 and RAM 520. Each of ROM 510 and RAM 520 can include several modules as may be required for storage requirements in a particular environment. ROM 510 can store bit maps for various text elements, including font and pointer, and program instructions for microcontroller 190. In one embodiment, RAM 520 is implemented using a static RAM for faster access. In addition, RAM 520 having multiple ports for reading/writing can be chosen for enhanced performance. However, other types of memory can be used as RAM 520 as will be apparent to one skilled in the art by reading the description provided herein.

OSD controller 170 stores each display entity as a different surface, with each surface being stored separately. Thus, pointer, low resolution data, and network application data are represented as being stored in portions 521, 522 and 523, respectively. A final display is generated by overlaying these surfaces on television signal display as described below. To facilitate the overlay operation, each of these surfaces can be defined with reference to a common X, Y coordinate system. For example, the left top corner of the television signal may be viewed as a point with coordinates (0, 0) as shown in FIG. 5B.

Each of the surfaces can be stored using different number of bits per pixel (bpp) depending on the display color resolution sought for that display entity. For example, pointer may be stored using 2 bpp, using 4 bpp, and network application data using 8 bpp. By using lesser number of bits for display entities not requiring a high degree of color resolution, the storage space in RAM 520 may be optimally utilized, without the need for buffering on any one surface.

In one embodiment, each portion 521, 522, 523 of RAM 520 include sufficient storage to store each display entity as a bit map. That is, each portion includes sufficient memory storage to store a number of pixel data elements equal to the number of pixels on display screen 150. However, a different scheme for representing the display elements (or bit maps) can be used without departing from the scope and spirit of the present invention. For example, in an alternative embodiment, pointers may be maintained to define location and dimensions of one or more display entities, and pixel data for only the valid pixel data elements can be stored. Irrespective of the scheme for storing the display entities, each of these portions is updated to correspond to the corresponding display entity.

Different portions are updated from different sources. The bit maps representing pointer and low resolution data elements (preferably in different fonts) can be stored in ROM 510 and transferred to specific portions of RAM portions 521 and 522 as determined by where the pointer and low resolution data are respectively to be displayed on display screen 150. The specific position of pointer may be determined by user input. Network application data is received on network interface 110 as explained above. The display entities (including the television signal) are overlaid to generate the final display on display screen 150 as will be explained in further detail with reference to FIG. 5B.

With reference to FIG. 5B, there are illustrated examples of television signal display 599, text (low resolution) display 580, pointer display 590, and network application display 560 on television display screen 150. Area 560 corresponds to the area surrounded by the solid line defining the area 560. Area 599 corresponds to the area outside of box 560. Points A, B, C, and D are shown as points on television signal display 599, pointer display 590, low resolution display 580, and network application display 560 respectively.

As noted earlier, television signal display is given the lowest priority. Accordingly, the other displays are overlaid 'on top of' television signal display 599. The priorities are implemented by using a 'transparency color'. Also, the pixel displays represented by 'x' within area 580 represent half-tone displays, also explained below.

With reference to FIGS. 5A and 5B, there are illustrated one way of representing bit maps for each display entity. That is, each portion 521, 522, and 523 stores data values for each pixel on display screen 150. A1, A2, and A3 represent pixel element data values corresponding to point A of display 550. Similarly, B1–B3, C1–C3, and D1–D3 represent data values corresponding to points B, C, and D respectively. The values of all the pixel data values are chosen so as to enable OSD controller 170 to implement priorities and half-tone signals.

In relation to transparency color, the transparency color is used to implement priorities among all the display entities. The transparency color can be programmable. A pixel data element of a portion is set to the transparency color if the corresponding portion is not displayed in the corresponding display screen pixel position. For example, at position A, none of the three display entities stored in RAM 520 are displayed. Accordingly, A1, A2 and A3 are each set equal to the transparency color.

Thus, if a pixel data element has a value equal to the transparency color, another pixel data element in a lower priority display entity is considered for display. If all the pixel data elements for a display pixel position have a value equal to the transparency color, the television signal is displayed at that display pixel position. Also, if a higher priority display entity has a pixel element value which is not equal to the transparency color, the lower priority display entities can also have pixel data values which have values not equal to transparency color value. In this case, the values in the lower priority display entities can be ignored. The transparency color bit-map is typically created by operating system driver working in conjunction with OSD controller. Operating system and its drivers can be stored and provided from ROM.

As regards to half-tone color feature, it provides a convenient mechanism by which the television signal display can be altered in specific pixel positions. For example, the television signal display can be darkened in the pixel corresponding to another entity display so as to provide for better visibility of the another entity as can be understood with the pixels in the low resolution area 580 as explained below.

Low resolution display area 580 includes display of text 'MUTE'. If this text were to be displayed without altering the television signal in pixel position represented by 'x' there, the text 'MUTE' may not be visible clearly. Instead, the television signal display is altered (specifically darkened) in the pixel positions corresponding to 'x'. Due to such alteration, the pixel positions corresponding to text 'MUTE' would be more clearly visible to the user. The manner in which the alteration can be achieved using half-tone color and signals is explained below with reference to pixel position shown as 'C' in area 580.

As already noted, C1, C2, and C3 represent the pixel data values for the pixel position C for the pointer, low resolution and network application data displays respectively. As the display of the area 580 is controlled by low resolution display, C1 may be set equal to the transparency color value. To alter the television signal display for pixel position C, C2 may be set equal to a half-tone color value. When OSD controller 170 receives the half-tone color value, it sends a half-tone signal on bus 173 (of FIG. 1) to cause encoder 130 to alter the television signal display at the corresponding pixel.

Thus, by a proper choice of half-tone color values of pixel positions 'x', micro-controller 190 can cause the background display to be altered or darkened. Even though half-tone color display is explained with reference to text display, it should be understood that the half-tone colors can be used with other display entities stored in memory as well. However, in one embodiment, half-tone colors are not provided with pointer pixel data.

Thus, RAM 520 (or memory module 180, in general) contains various data values which are used to achieve different visual effects. The manner in which an embodiment of OSD controller 170 achieves these affects (half-tone, overlays) will be clear from the description below. The description further illustrates the manner in which the requests for retrieving data corresponding to all display entities (including network application data) are given higher priority compared to the access requests received from BLT engine 195 and micro-controller 190.

6. Example Implementation of OSD Controller

Figure 3:
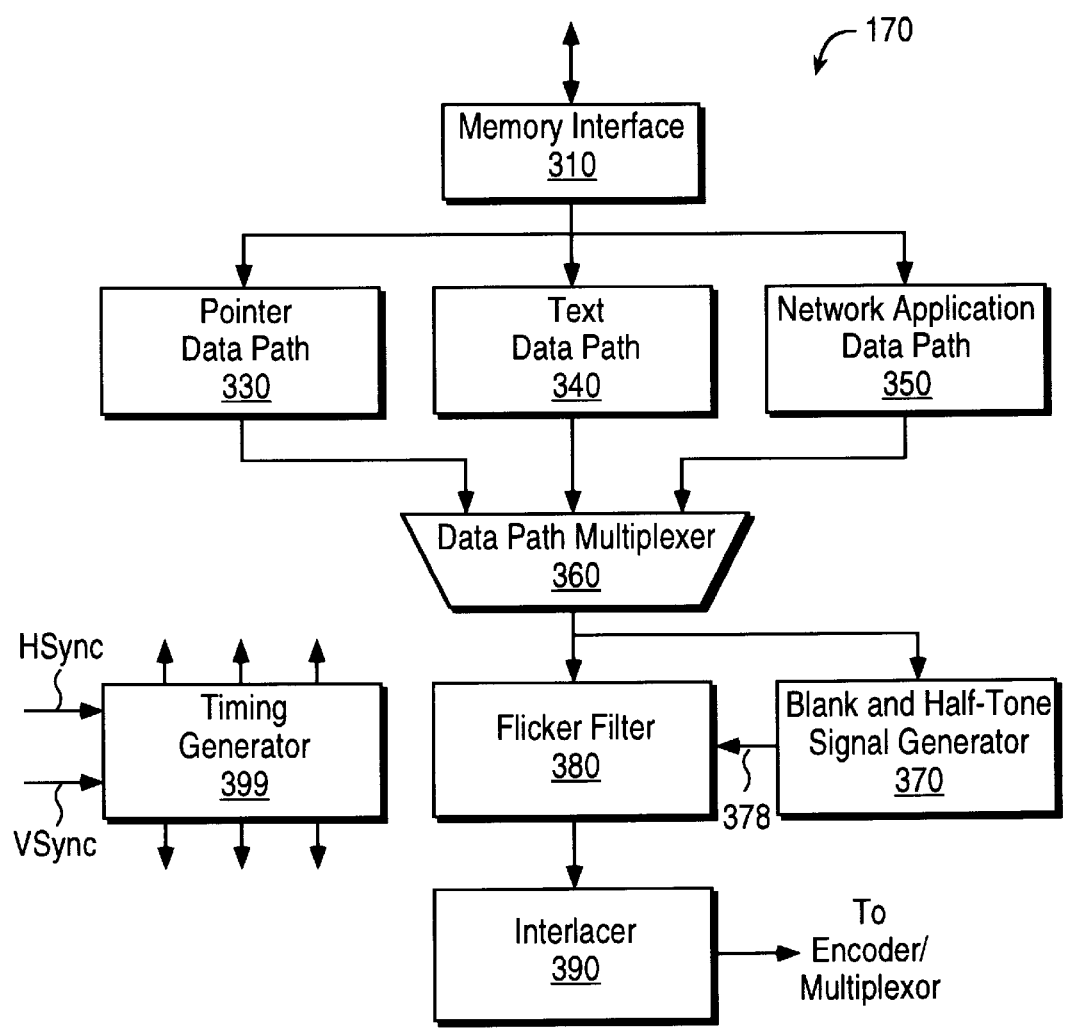
FIG. 3 is a block diagram of an on-screen display controller which generates requests for retrieving the data representing the display entities.

FIG. 3 is a block diagram of an example implementation of OSD controller 170 illustrating some other types of requests that may be received by memory controller 185. OSD controller 170 comprises memory interface 310, pointer data path 330, low resolution (text) data path 340, network application data path 350, data path multiplexor 360, blank and half-tone signal generator 370, flicker filter 380, Interlacer 390, and timing generator 399. As described below, the three data paths 330, 340, and 350 generate requests for accessing the data stored in memory module 180.

Each of the three data paths 330 (pointer), 340 (low resolution data) and 350 (network application data) send requests for retrieving the pixel data elements for the corresponding surface. The data paths receive data from memory module 180 via memory interface 310. The data paths process the pixel data elements as described below and in RELATED APPLICATION 1. Memory interface 310 provides the electrical and other protocol functions to interact with memory controller 185 and provide the pixel data elements to the three data paths. During the process, memory interface 310 passes any requests for retrieval of data to memory controller 185.

Data path multiplexor 360 is coupled to the outputs of the three data paths 330, 340 and 350. Half-tone and blank generator 370 and flicker filter 380 are coupled to the output of data path multiplexor 360. Interlacer 390 is coupled to the output of flicker filter 380. Timing generator 399 is coupled to all the other components of OSD controller 170, but the connections are not shown for purpose of clarity.

Data is received by the three data paths 330, 340 and 350, typically in response to commands from micro-controller 190 to memory controller 185. The commands include operations to store and retrieve data from memory module 180. Memory controller 190 can execute programs defined by data retrieved as a result of execution of the commands. Some of the retrieved commands cause data to be transferred to data paths 330, 340 and 350, and the transferred data may correspond to the pallette data stored in the respective data paths.

The store commands cause data to be stored in memory module 180 (specifically in RAM 520 of FIG. 5A). Such data is typically stored to modify (or define) a corresponding surface. For example, if television 100 receives additional network data from an external source, the received data may be stored in memory module 180. Similarly, if a user causes the pointer to be moved (for example, by movement of a joy stick/mouse), data is received to reflect the new position of the pointer. When the surface data with the changes is displayed, a correspondingly changed image is displayed.

Continuing with the description of memory controller 185 with reference to FIG. 3, memory controller 185 retrieves pixel data elements for each of the paths 330, 340, and 350. Each retrieved pixel data element corresponds to a specific pixel position on display screen 150. This specific pixel position in turn matches a position corresponding to the television signal received in parallel. Accordingly, a decision is made whether to display the television signal or the pixel data element selected from the paths 330, 340, and 350 on a pixel by pixel basis.

Figure 7:
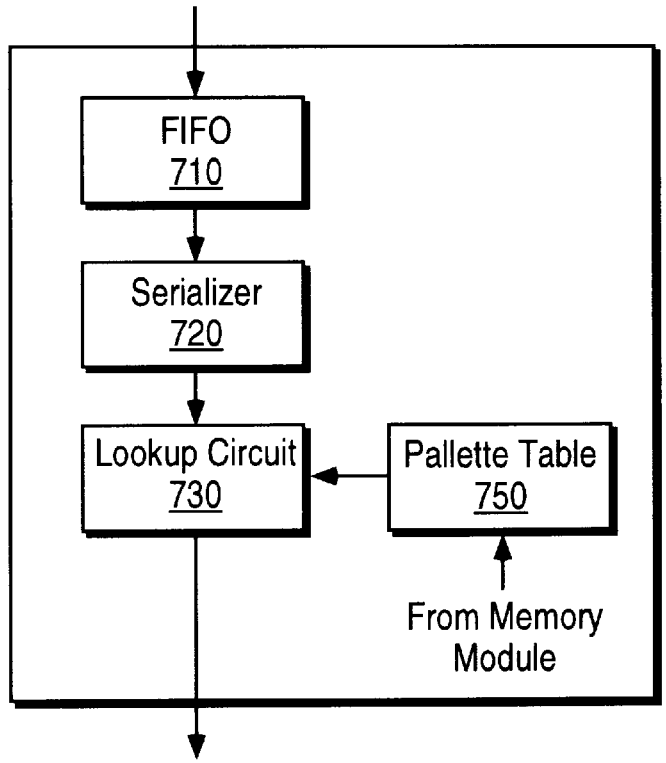
FIG. 7 is a block diagram of a data path illustrating the manner in which each display entity can be processed prior to generating display signals.

The data paths 330, 340, and 350 will be explained with reference to FIG. 7, which is a block diagram of an example embodiment of network application data path 350. The description may be applicable to other data paths as well. FIFO 710 receives pixel data elements in the form of multiple words of data from memory controller 185. Each received word can include multiple pixel data elements depending on the storage format chosen. For example, if network application data is encoded in 8 bpp format and if each received word includes 16 bits of pixel data, each received word includes two pixel data elements. Typically, more number of bits are used for storing the network application data as higher resolution may be desired in the display of network application data.

The number of words in (or depth of) FIFO 710 determines the frequency with which requests for retrieving network application data are sent to memory controller 185. That is, as more pixel data elements are retrieved and stored in FIFO 710, a correspondingly lower number of requests will be sent to memory controller 185. FIFO 710 may be implemented with a different amount of memory storage for each display entity. For example, if network application data is encoded in 8 bpp format and pointer data is implemented using 2 bpp format, FIFO 710 for network application data may have four times as much memory storage as a FIFO in pointer data path 330. However, the FIFOs in each of the data paths may be designed such that an equal number of pixel data elements are retrieved and stored in each FIFO. Such an equality ensures that the requests for retrieving pixel data elements for all data paths will be generated around the same time.

In an alternative embodiment, each data path may be designed to generate retrieval requests with different periods (or according to other schemes which allow for the determination of the expected arrival time for the next request for retrieval from the corresponding data path). In such a case, a block signal may be generated for each display entity independently to ensure that the corresponding display entity is available for display at the required juncture.

Serializer 720 serializes the multiple pixel data elements potentially packed into each received word, and provides a pixel data element at a time to lookup circuit 730. Lookup circuit 750 converts each pixel data element into color data with more number of bits in a known way. For example, each pixel data element may received in 8 bpp format, and mapped into 5:6:5 or 6:6:6 RGB data. The pallette table in turn may be loaded (from ROM 510) by appropriate data in response to commands from micro-controller 190 as already noted. From the above, it will be readily understood that each of the data paths 330, 340 and 350 generates as output a pixel data element in a pre-determined format.

Continuing the description with reference to FIG. 3, data path multiplexor 360 selects one of the three pixel data elements received from the data paths 330, 340 and 350 according to a predetermined priority and using the transparency color. An example method implemented by data path multiplexor 360 is explained below with reference to FIG. 4.

Blank and half-tone signal generator 370 generates a blank signal and half-tone signals. The blank signal is used to select the pixel data element selected by data path multiplexor 360 or the corresponding point of the television signal display. The blank signal is accordingly provided on line 141 of FIG. 1. Specifically, if the output of data path multiplexor equals the transparency color, the television signal is displayed. The manner in which blank signal is generated in one embodiment will be explained below with reference to FIG. 6.

In one embodiment, blank and half-tone generator 370 provides the blank and half-tone signals to flicker filter 380 on bus 378 to flicker-filter 380. In turn, flicker filter 380 stores and/or transfers data bits representative of these signals correlated with the pixel data selected from data path multiplexor 360. Such a correlation allows OSD controller 170 to appropriately process corresponding portion (point) of television signal received in another path. As noted above, half-tone signals cause television signal display to be altered and are provided on line 173 to encoder 130 of FIG. 1. One embodiment for generating the half-tone signals will be described with reference to FIG. 6.

Flicker filter 380 filters the received pixel data element, for example, as described in RELATED APPLICATION 3 and RELATED APPLICATION 4. Filtering generally has the effect of smoothing the image eventually displayed. As a result of image smoothing, flicker may be reduced in the display on display screen 150. In one embodiment, flicker filter 380 includes a buffer to store two or more lines of data. However, a different number of lines can be stored and used during filtering as will be apparent to one skilled in the relevant arts by reading the description provided here. Filtering may be performed relative to both previous lines and subsequent lines. Also, filtering may be optionally disabled by bypassing flicker filter 380 and providing the selected pixel data element directly to Interlacer 390.

Interlacer 390 receives pixel data elements representing a non-interlaced image and provides as output alternate lines representing an interlaced image. Odd lines and even lines are provided alternately. The conversion is performed as display screen 150 is designed to display an interlaced image. In one embodiment, Interlacer 390 uses different clocks for receiving input and generating output lines, with the input clock having twice the frequency of the output clock. One or more embodiments of Interlacer 390 are described in RELATED APPLICATION 3 and RELATED APPLICATION 4.

It should be noted that a new pixel data value is typically generated by the operation of flicker filter 380. Accordingly, the blank and half-tone signals are generated before pixel data elements are processed by flicker filter 380. It should be further noted that Interlacer 390 may be bypassed (or eliminated) if display screen 150 is implemented using non-interlaced technology.

Timing generator 399 generates the clocking and control signals for different components of OSD controller 170. Timing generator 399 receives as input the HSYNC and VSYNC signals from the television signal (connection not shown in FIG. 1) and generates signals to ensure that the overlaid image pixel data elements sent from Interlacer 390 (and blank/half-tone signals) correspond to the individual points on the image of the television signal. An embodiment of timing generator 399 is described in RELATED APPLICATION 2.

The output of Interlacer 390 is provided as an input to multiplexor 140 on line 174. As will be apparent from the description above, the output of Interlacer 390 represents the overlaid mage of the display entities stored in RAM 520. In addition, the blank signal generated by data ath multiplexor 360 is provided on signal line 141. One value of blank signal causes multiplexor 140 to select the television signal pixel data element received from encoder 130, and the other value of the blank signal line causes multiplexor 140 to select the pixel data element received from Interlacer 390. Thus, the blank signal determines how the overlaid signal is prioritized in relation to the television signal for the pixel under consideration. The manner in which the blank signal and half-tone signals can be generated will be explained in further detail below with reference to FIGS. 5 and 6.

7. Generating blank/half-tone signals in one embodiment

The selection of one of the three pixel data elements and generating the blank signal is explained in further detail with reference to FIG. 4, which is a flow-chart illustrating a method of prioritizing the display entities and of generating half-tone signals in one embodiment of the present invention. As noted above, transparency color value is stored in individual pixel positions in memory module 180 to achieve prioritization. Also, half-tone color values are stored in individual pixel positions to generate half-tone signals, which cause television signal display to be altered at individual pixel positions. Prioritization and half-tone signal generation are explained in detail below.

Broadly, the method gives priority to pointer, low resolution data, and network application data displays in the decreasing order. That is, if the pointer area covers the present screen pixel position (i.e., the point on the display screen 150, on which the pixel data elements can potentially be displayed), the pixel data element received from pointer data path 350 is selected and displayed. Pixel data element corresponding to low resolution data is selected only if the pointer area does not cover the present screen pixel position. In such a situation, the pointer bit map for that pixel is set to transparency color. In one embodiment, half-tone colors are not used in conjunction with pointer data. As can be appreciated, micro-controller 190 selects an appropriate transparency color and ensures a consistent operation in all the components.

Figure 4:
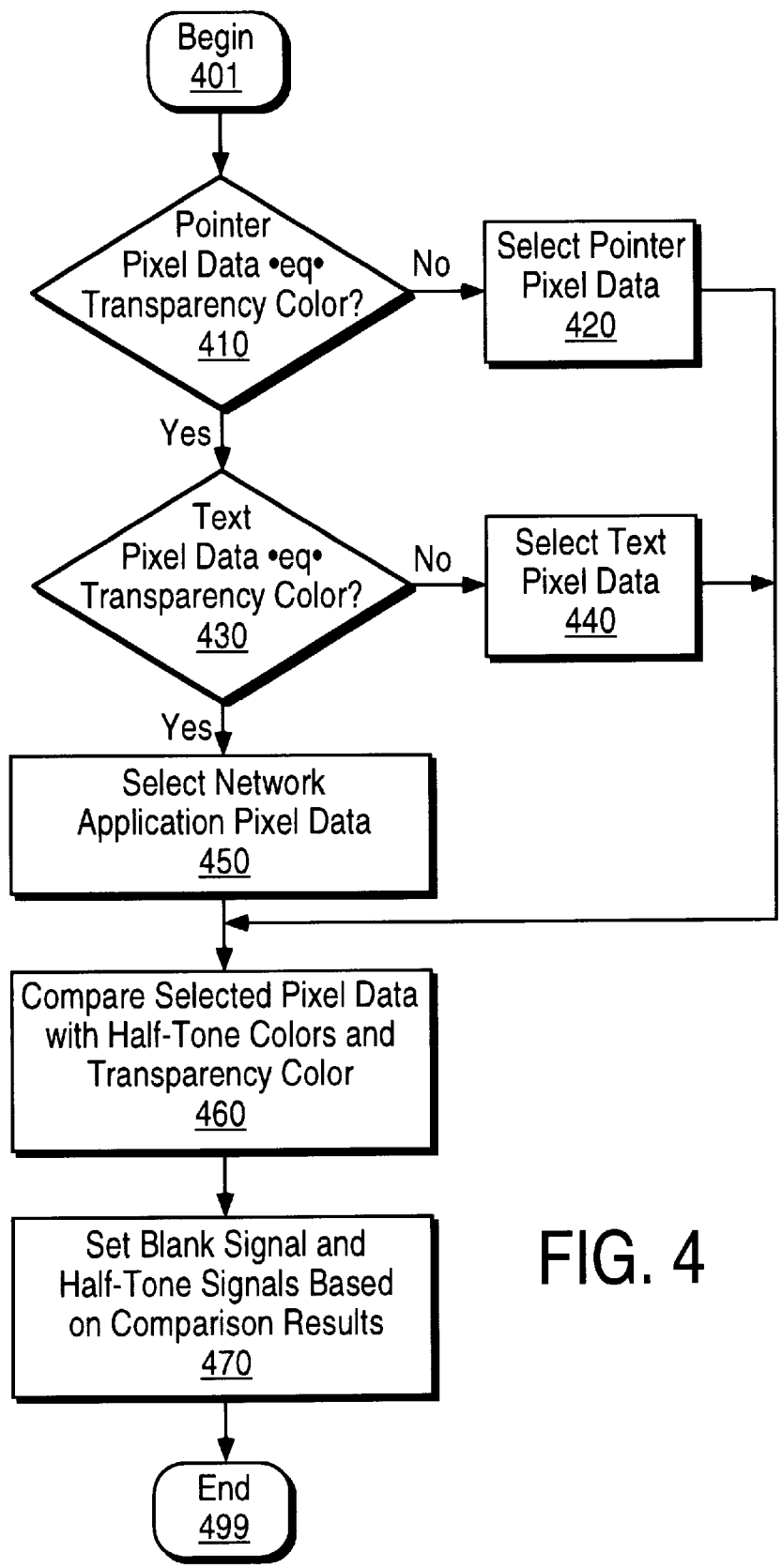
FIG. 4 is a flow chart illustrating a method of overlaying the display entities stored in a memory unit.

The method of FIG. 4 operates taking into consideration the above described principles. Thus, in step 410 a determination is made whether the pixel data element received on pointer data path 350 equals the transparency color. If an equality if not detected, the pointer pixel data element is selected in step 420. That is, step 420 is performed if the pointer area covers the present screen pixel position or if the television signal needs to be altered at that pixel position display on television screen 150.

If equality is detected in step 410 (i.e., pointer pixel is set to transparency color), the low resolution data pixel data element is compared to the transparency color in step 430. If equality is not detected in step 430, the low resolution data pixel data element is selected in step 440. If equality is detected in step 430, the network element pixel data is selected in step 450. In other words, the network application pixel data element is selected if both pointer and text pixel data elements have a value equal to transparency color. From the above description it should be understood that pointer data is given the highest priority, followed by low resolution data and network application data in that order.

Steps 460 and 470 operate to generate the blank and half-tone signals. In step 460, the pixel data element selected according to steps 430, 440 and 450 is compared with half-tone colors and transparency color. In step 470, the blank signal and half-tone signals arc set according to the comparison. An embodiment implementing the two steps will be described with reference to FIG. 6 below.

Figure 6:
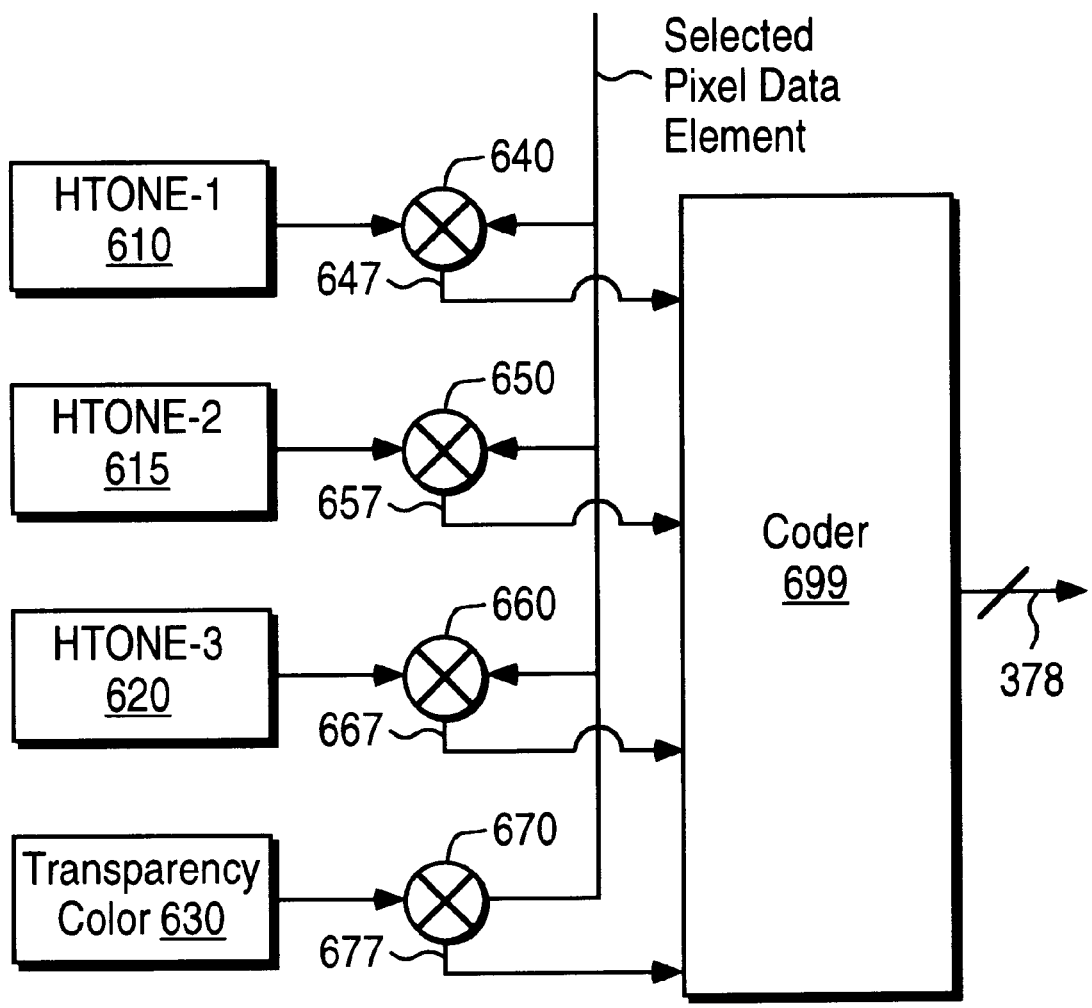
FIG. 6 is a block diagram further illustrating the manner in which the display entities are overlaid.

FIG. 6 is a block diagram of a circuit which generates the blank signal and half-tone signals in one embodiment. The circuit includes four programmable registers 610, 615,620, and 630, four comparators 640, 650, 660, and 670, and coder 699. Comparator 640 accepts as inputs the pixel data element selected in steps 410–450 and the content of programmable register 610, and generates a signal which is indicative of the result of the comparison on line 647. The four programmable registers 610, 615, 620, and 630 store half-tone 1, half-tone 2, half-tone 3, and transparency color value respectively. Comparators 640, 650, 660, and 670 compare the selected pixel value with the contents of programmable registers 610, 615, 620, and 630 respectively. The results of the comparison are available on lines 647, 657, 667, and 677 respectively.

Thus, lines 647, 657, and 667 respectively indicate whether the selected pixel data element has a value equal to half-tone 1, half-tone 2, and half-tone 3 colors respectively. As noted above, the corresponding half-tone signals generated cause TV signal encoder 130 to alter (e.g., make darker) display on the corresponding points of display screen 150. In addition, different half-tone signal can cause the pixel display to be altered to a different degree. For example, half-tone 1 may cause the television signal pixel display to be extremely dark. while other half-tone signals can cause the display to be less darker (or brighter or set to a user-definable color).

Line 677 represents the blank signal. It should be noted that the comparison in comparator 670 returns an 'EQUAL,' signal only if all the pixel data elements received on the three data paths 330, 340, and 350 have a value equal to transparency color. In that case, the blank signal is said to be unasserted (or deasserted) and the television signal is caused to be displayed by the appropriate control of multiplexor 140. When the blank signal is asserted, the pixel data element provided by OSD controller 170 is displayed. Thus, signal 677 is eventually sent to multiplexor 140 on line 141. It should further be noted that when the blank signal is unasserted, the values on the lines 647 and 657 may not be of any consequence.

As at most only one of the values on lines 647, 657, and 667 can have a value of 1 (i.e., match), coder 699 encodes the bits on these lines into two lines/pins (OVER-LAY 1 and OVER-LAY 2). As OSD controller 170 can be implemented as an integrated circuit packaged as a semiconductor chip, such encoding reduces the number of pins on the chip and the size of the storage for filter line buffers and/or Interlacer storage. In addition, as the half-tone and blank signals are stored correlated with the pixel data element selected by data path multiplexor 360, the encoding avoids the need for excessive data storage.

Table 1 shown below summarizes the manner in which half-tone and blank signals affect the display on television screen, and the values output by coder 699. It may be noted that when a half-tone signal is generated, the blank signal is deasserted causing the television signal to be 10 displayed, but the television signal display is altered according to the specific half-tone signal asserted as specified by the OVRLY1 and OVRLY2 signals. The OVRLY1 and OVRLY2 signals are provided to encoder 130 on bus 173. It should be understood that the number of half-tone signals explained here is merely representative and a different number of half-tone signals can be used without departing from the scope and spirit of the present invention.

TABLE 1

| Blank | Half-Tone | Comments | BLANK, OVRLY2, OVRLY1 Encoding |
|---|---|---|---|
| deasserted | deasserted | display normal TV image | 0, 0, 0 |
| deasserted | asserted | display altered (darker) TV image | 001, 010, 011 for three levels of half-tone (Note that blank is deasserted in these combinations) |
| asserted | don't care | display pointer, low resolution or network application data | 1, x, x ('x' represents don't-care value) |

Thus, OSD controller 170 stores the network application data and other display entities in a memory module to provide network application access capability. Each of the display entities are stored in different portions of the memory module such that each can be independently modified. The modified display entities are overlaid on each other according to a priority scheme to generate a final display on a television display screen.

Thus, the network application data is displayed along with the images encoded in the television signal in a unified manner, which allows a user to access network applications from the television system. As noted above, the accesses to network application data are given higher priority in accordance with the present invention as described below in further detail. All the access requests to memory controller 185 are noted first, and the manner in which the accesses to network application data is given higher priority in one embodiment is explained next.

8. Access Requests to Memory Controller

Figure 8:
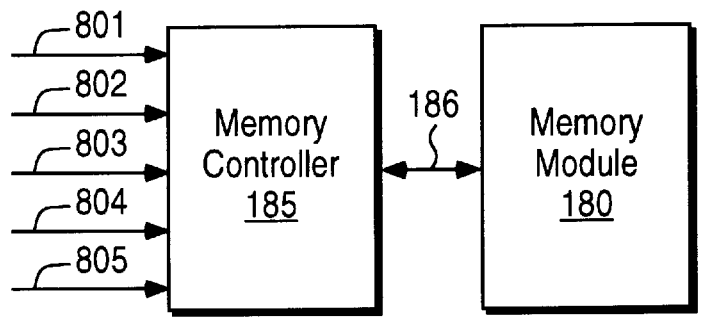
FIG. 8 is a block diagram including a memory controller and a memory module illustrating different types of requests which may received for accessing data present in a memory module.

FIG. 8 is a block diagram including memory controller 185 and memory module 180 illustrating the various types of memory access requests received by memory controller 185 in one embodiment of the present invention. Memory controller 185 receives five types of memory access requests (among others): block transfer requests from BLT engine 195 on line 801, data access requests from micro-controller 190 on line 802, requests for pointer data from pointer data path 330 on line 803, requests for text data from text data path 340 on line 804, and requests for network application data from network application data path 350 on line 805. Of these requests, the requests from data paths are given higher priority and the other requests are given lower priority. Memory controller 185 can serve other types of requests also, which will not be described here as they may not be relevant for an understanding of the present invention.

Some of the lower priority requests (e.g., BLT access requests) may be processed in bursts and the bursts may last for several clock cycles. Should the request to retrieve data representing display entities be blocked (or be placed waiting) until the low priority requests are completed, data paths 320, 330 and 340 may not generate pixel data elements in time for generating display signals. Even if the low priority requests are suspended upon arrival of the high priority requests, it should be understood that the time to suspend a low priority operation may be unacceptably high. The delay caused in servicing the retrieval requests from the data paths is illustrated below with reference to the timing diagrams of FIG. 9A.

To avoid such delays, memory controller 185 blocks (delays granting memory access to) the low priority requests (including BLT access requests) a few clock cycles prior to the expected time of receiving the next retrieval request from the data paths. In addition, memory controller 185 suspends any low priority operations in progress a few clock cycles prior to the expected time of receiving the next retrieval request from the data paths. As the completion of the suspension operation can take a few clock cycles, the requests for retrieving pixel data elements of the display entities can be serviced at least within a short duration of arrival.

It should be understood that the data paths and memory can operate using different clocks (and clock periods). Memory controller 185 computes the expected time of arrival of next retrieval request in terms of the memory clock cycles. As noted above, the time between successive requests from a data path depends on the depth of the FIFO. Therefore, based on the FIFO depth, the arrival time of the next request for retrieval can be computed.

9. Servicing Requests from Data paths Without Blocking Low Priority Requests

Figure 9A:
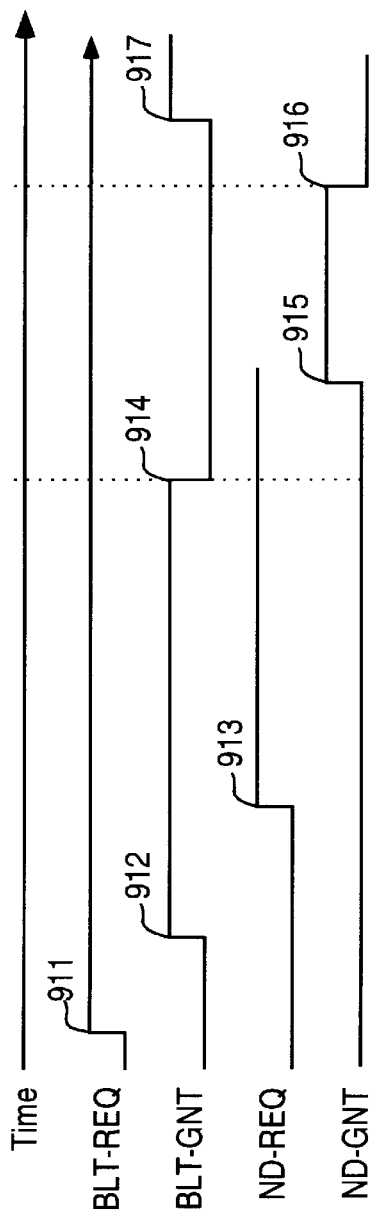
FIG. 9A is a timing diagram illustrating the delays caused in servicing the requests for retrieving display entities stored in a memory without the operation of the present invention.

The delays caused in servicing requests for retrieving pixel data elements representing display entities stored in memory module 180 without blocking low priority accesses (BLT accesses) are illustrated with reference to the timing diagram of FIG. 9A. Only the request for retrieving network application data is shown in FIG. 9A. However, it should be understood that the description can be applied to other display entities as well.

In addition, as noted above, the FIFO depths may be maintained such that the same number of pixel data elements are retrieved for all display entities so that the requests for retrieval are received at (or around) the same time. By giving higher priority to all the requests for retrieval received from the data paths, the requests can be serviced in a timely fashion.

In FIG. 9A, BLT-REQ (bit block transfer request), BLT-GNT (bit block transfer grant), ND-GNT (Network Application Data Request Grant) and ND-REQ (Network Application Data Request) signals are shown with reference to Time. A request to access memory is communicated to memory controller 185 by driving the corresponding REQ (request) signal to a high logical value. In turn, memory controller 185 grants access by driving the corresponding GNT (grant) signal to a high level to grant access to memory module 180.

BLT-REQ signal is shown going high at time point 911 and BLT engine 195 is given exclusive access to memory module 180 shortly thereafter at time point 912. A request for retrieving network application data is received at time 913 (a short duration after time 912). As BLT engine 195 has exclusive access to memory module 180, the request for retrieving network application data needs to wait until the BLT engine 195 relinquishes access to memory module 180.

In one embodiment, BLT requests are suspended when a higher priority request is pending. Therefore, the suspension operation begins at a time shortly after 913. The suspension operation usually takes a few clock cycles and accordingly the BLT-GNT signal is driven to a lower signal level a few clock cycles after time point 913. After the BLT accesses are suspended at time point 914, the buses coupling to memory module 180 are precharged for a few clock cycles before the ND-GNT signal is driven to a high logical level at time point 915. The network application data is retrieved from time point 915 until time point 916.

Between time points 915 and 916, the network application data is retrieved while the BLT accesses stay suspended. During the period of suspension, the BLT-REQ signal stays high indicating that BLT engine 195 needs to access memory module 180. Shortly after the retrieval of network application data is complete, BLT-GNT signal is raised to a high logical level at time point 917 again to cause the BLT access operation to continue.

It should be noted that the delay (between time points 913 and 915) in servicing request for retrieving network application data may be unacceptable. Accordingly, memory controller 185 ensures that the requests for retrieval of pixel data elements of the display entities are serviced in a shorter duration as described below with reference to FIG. 9B.

10. Blocking Low Priority Requests in Accordance with the Present Invention

Figure 9B:
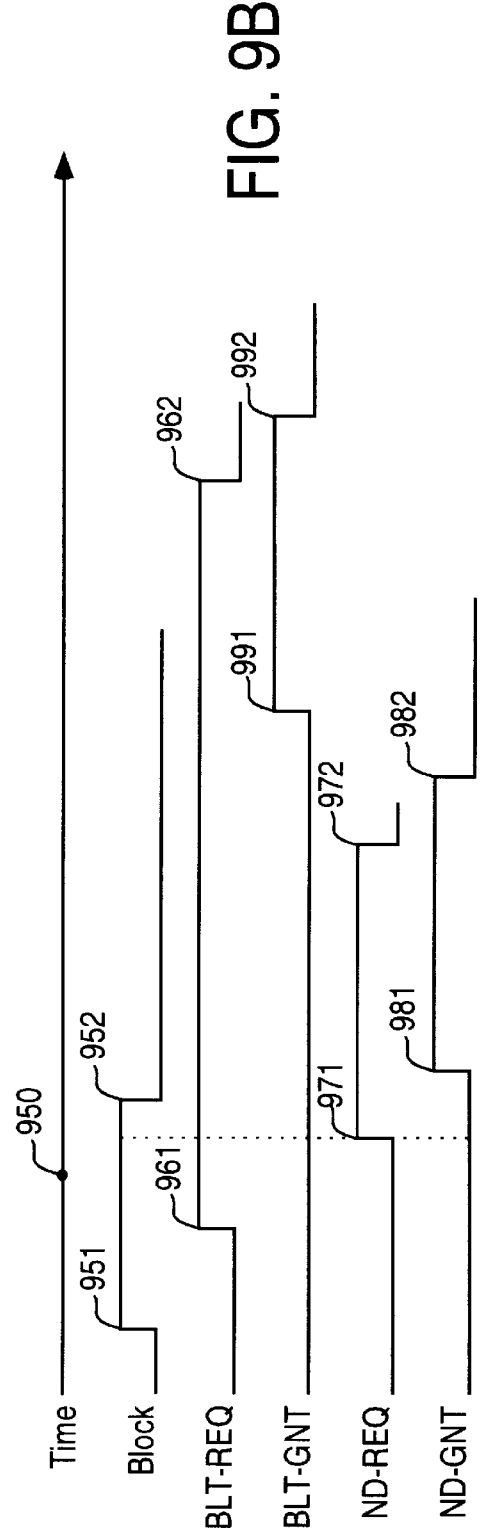

FIG. 9B is a timing diagram illustrating the manner in which the low priority requests are blocked to ensure that the requests from data paths are serviced in a timely manner. Five signals (BLOCK, BLT-REQ, BLT-GNT, ND-GNT, and ND-REQ) are shown with reference to Time axis. Time point 950 represents the time when the next request from a data path is expected to be received at. As noted above, the duration between successive requests generally depends on the corresponding FIFO width, and the time point 950 can be computed based on a time at which a previous request for retrieval is received.

BLOCK signal represents a time duration during which any presently serviced requests should be blocked. Blocking refers to not granting access to any pending lower priority requests or to suspending any in-progress lower priority requests. That is, when the BLOCK signal goes high, any presently serviced low priority requests are suspended and any pending (or new) low priority requests are not granted access. BLOCK signal is raised to a high logical level at time point 951, a few clock cycles prior to the expected arrival time (950).

The duration between 951 and 950 should be long enough such that the servicing of the high priority requests from the data paths begins within an acceptable period of time. For example, if the duration between 951 and 950 is too short, the suspension operation may take several clock cycles to complete after receiving a high priority request, and the high priority request may not be granted access to the memory module 180 within an acceptable time. On the other hand, if the duration between 951 and 950 is too long, low priority requests may be unnecessarily blocked (not granted or suspended).

FIG. 9B illustrates a scenario in which a low priority request is blocked as the low priority request is received while the BLOCK signal is at a high logical lelel. Thus, BLT-REQ signal (a low priority request) is shown going high at point 961, which is slightly after time point 951. As the BLOCK signal is at a high signal level, the low priority BLT request is blocked (i.e., not granted access to memory module 180).

If a BLT transfer operation were to be in progress at time point 951, the BLT transfer would have been suspended. Such suspension would enable the requests for retrieving network application to be serviced within a short duration because granting of the memory access would not be delayed by the time required for suspension (i.e., time between points 913 and 914 of FIG. 9A).

ND-REQ signal is shown going to a high logical level at time point 971 (a short duration after time point 961). As the lower priority requests have been blocked before hand, the request to retrieve network application data is granted within a short duration after time point 971 at time point 981. Shortly after time point 981, the BLOCK signal is driven to a low signal level at time point 952 to indicate that the lower priority requests need not be blocked.

The retrieval of network application data is shown being complete at time point 972. The ND-GNT signal is lowered to a low logical level at time point 982, a short duration after time point 972. The expected time of arrival of the next request for retrieval can be computed from point 972 if the retrieval requests are periodic. While the network application data is being retrieved, BLT-REQ continues to be asserted. BLT requests are granted access at time point 991, a short duration after ND-GNT signal is lowered. Once the BLT transfer is complete at point 962, BLT-GNT is lowered at time point 992.

In one embodiment, the requests for retrieving other display entities stored in memory 185 are generated with the same period as that at which the requests for retrieving network application data are generated. Accordingly, these other requests for retrieval are also received around the same time at time point 971. All these requests are given higher priority. Accordingly, all the display entities can be retrieved in a timely fashion and provided for screen refresh.

In an alternative embodiment, the requests for retrieval can be received from each display entity based on a different scheme. In such a situation, the expected time of arrival of the request for retrieval is computed independently for each display entity and a blocking signal may be generated to ensure that the lower priority accesses do not block any of the requests to retrieve the display entities. With reference to FIG. 9B, BLOCKING signal can be raised to satisfy the blocking requirement for all the display entities. That is, if at least one display entity needs the lower priority requests to be blocked, the BLOCKING signal is raised. The blocking signal can accordingly be viewed as a early high priority signal used to block/inhibit the lower priority access requests.

As can be readily appreciated, the high priority request from the data paths are provided access to memory module 180 in a shorter time in the scenario of FIG. 9A compared to the scenario of FIG. 9B. Accordingly, the data may be available in a timely manner for refreshing display screen 150. As a result, display artifacts may be avoided.

11. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of refreshing a display screen of a television system with images of a display entity, said method comprising the steps of:

(a) storing data representing said display entity in a memory;

(b) generating a plurality of requests for retrieving said data representing said display entity, wherein successive requests are generated with an interval equal to a predetermined period;

(c) determining an expected time for receiving a next request based on said predetermined period;

(d) blocking lower priority access requests to said memory from a few clock cycles prior to said expected time such that said next request will have access to said memory upon arrival;

(e) retrieving said data representing said display entity in response to receiving said next request; and (f) refreshing said display screen using said data retrieved in step (e), wherein step (e) can be performed within a short duration after arrival of said next request due to said blocking of lower priority access requests in step (d), whereby said display data is available for said step of refreshing in a timely manner.

2. The method of claim 1, wherein said display entity comprises network application data.

3. The method of claim 1, wherein said display screen is refreshed with images generated by combining a plurality of display entities including said display entity, said method comprising the further steps of:

(g) providing a plurality of data paths, with each data path processing one of said plurality of display entities;

(h) overlaying said plurality of display entities by selecting one of said display entities on a point-by-point basis to generate data representing images for refreshing said display screen;

(i) including a FIFO in each of said data paths;

(j) generating a request for retrieving a corresponding display entity when a corresponding FIFO is at least substantially empty, wherein said FIFO is implemented with a depth such that the requests for retrieving display entities are generated by all of said plurality of data paths with an equal time period, (k) providing all of said requests for retrieving display entities a higher priority such that data representing all of said display entities are available in a timely manner for refreshing said display screen.

4. The method of claim 1, wherein step (d) comprises the step of beginning suspending any lower priority accesses being serviced a few clock cycles prior to said expected time such that the suspension is complete at least within an acceptable number of cycles after receiving said next request.

5. The method of claim 1, wherein step (d) comprises the step of not granting any lower priority accesses such that said next request can be granted access to said memory immediately upon arrival.

6. The method of claim 1, wherein said memory operates using a first clock signal and said retrieval requests are generated using a second clock signal.

7. The method of claim 1, wherein said lower priority access requests comprise a bit block transfer access.

8. The method of claim 1, wherein said blocking is used an early high priority memory request such that lower priority memory access requests are blocked.

9. A display apparatus for displaying the images of a display entity on a display screen of a television system, wherein said display screen is refreshed several time in quick succession to display the images, said display apparatus comprising:

a memory for storing data representing said display entity;

means for generating a plurality of requests for retrieving said data representing said display entity, wherein successive requests are generated with an interval equal to a predetermined period;

means for determining an expected time for receiving a next request based on said predetermined period;

means for blocking lower priority access requests to said memory from a few clock cycles prior to said expected time such that said next request will have access to said memory upon arrival;

means for retrieving said data representing said display entity in response to receiving said next request; and means for refreshing said display screen using said data retrieved by said means for retrieving;

wherein said data can be retrieved within a short duration after arrival of said next request due to said blocking of lower priority access requests, whereby said display data is available for said refreshing means in a timely manner.

* * * * *